(12) United States Patent
Shinohara et al.

(10) Patent No.: US 11,889,557 B2
(45) Date of Patent: *Jan. 30, 2024

(54) WIRELESS COMMUNICATION SYSTEM, WIRELESS COMMUNICATION METHOD, WIRELESS LAN ACCESS POINT, AND WIRELESS LAN STATION

(71) Applicant: NIPPON TELEGRAPH AND TELEPHONE CORPORATION, Tokyo (JP)

(72) Inventors: Shoko Shinohara, Yokosuka (JP); Yasuhiko Inoue, Yokosuka (JP); Akira Kishida, Yokosuka (JP); Riichi Kudo, Yokosuka (JP); Masato Mizoguchi, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/690,625

(22) Filed: Mar. 9, 2022

(65) Prior Publication Data

US 2022/0201759 A1   Jun. 23, 2022

Related U.S. Application Data

(63) Continuation of application No. 16/787,138, filed on Feb. 11, 2020, now Pat. No. 11,304,233, which is a
(Continued)

(30) Foreign Application Priority Data

Feb. 24, 2015   (JP) ................................. 2015-034352

(51) Int. Cl.
*H04W 74/08* (2009.01)
*H04B 7/0452* (2017.01)
(Continued)

(52) U.S. Cl.
CPC ...... *H04W 74/0816* (2013.01); *H04B 7/0452* (2013.01); *H04W 28/0268* (2013.01);
(Continued)

(58) Field of Classification Search
CPC ......... H04W 74/0816; H04W 28/0268; H04W 72/12; H04W 74/002; H04W 84/12;
(Continued)

(56) References Cited

U.S. PATENT DOCUMENTS 10,631,337 B2 * 4/2020 Shinohara ............ H04B 7/0452
11,304,233 B2 * 4/2022 Shinohara ............ H04B 7/0452
(Continued)

FOREIGN PATENT DOCUMENTS

CN    102308527 A    1/2012
CN    102792755 A    11/2012
(Continued)

OTHER PUBLICATIONS

"Part 11 : Wireless LAN Medium Access Control (MAC) and Physicial (PHY) Layer Specification"; IEEE Std 802.11acTM, Dec. 11, 2013.
(Continued)

*Primary Examiner* — Jae Y Lee
(74) *Attorney, Agent, or Firm* — Harness, Dickey & Pierce, P.L.C.

(57) ABSTRACT

A predetermined STA includes a station information collection unit collecting from the STA itself and other STAs station information used for selection of STAs performing simultaneous transmission and for control of the simultaneous transmission, and a simultaneous-transmission request unit knowing occurrence of a QoS data frame based on the station information and transmitting a request frame requesting the simultaneous transmission to an AP. The AP includes a station information collection unit; a simultaneous-trans-
(Continued)

mission determination unit selecting a combination of the STAs performing the simultaneous transmission based on the station information by reception of the request frame; and a trigger transmission unit transmitting to each of the STAs performing the simultaneous transmission a trigger frame instructing to performs the simultaneous transmission and including information necessary for controlling the simultaneous transmission. Each of the STAs designated by the trigger frame is configured to simultaneously transmit the wireless frames to the AP.

2 Claims, 9 Drawing Sheets

Related U.S. Application Data continuation of application No. 15/547,405, filed as application No. PCT/JP2016/055211 on Feb. 23, 2016, now Pat. No. 10,631,337.

(51) Int. Cl.
  *H04W 28/02* (2009.01)
  *H04W 84/12* (2009.01)
  *H04W 72/12* (2023.01)
  *H04W 74/00* (2009.01)

(52) U.S. Cl.
  CPC .......... *H04W 72/12* (2013.01); *H04W 74/002* (2013.01); *H04W 84/12* (2013.01)

(58) Field of Classification Search
  CPC ........... H04W 72/1205; H04W 72/121; H04W 72/1236; H04W 72/1284; H04W 72/1289; H04W 74/0808; H04W 88/08; H04B 7/0452; Y02D 30/70
  See application file for complete search history.

(56) References Cited

U.S. PATENT DOCUMENTS

| | | | |
|---|---|---|---|
| 2002/0181492 A1 | 12/2002 | Kasami et al. | |
| 2009/0129353 A1 | 5/2009 | Ki et al. | |
| 2011/0205968 A1 | 8/2011 | Kim et al. | |
| 2012/0263158 A1 | 10/2012 | Lee et al. | |
| 2013/0286959 A1 | 10/2013 | Lou et al. | |
| 2014/0269544 A1 | 9/2014 | Zhu et al. | |
| 2015/0063258 A1* | 3/2015 | Merlin | H04W 74/04 370/329 |
| 2015/0063340 A1 | 3/2015 | Cai et al. | |
| 2015/0117429 A1 | 4/2015 | Lee et al. | |
| 2015/0249529 A1 | 9/2015 | Zheng et al. | |
| 2015/0358995 A1 | 12/2015 | Li et al. | |
| 2015/0359008 A1 | 12/2015 | Wang et al. | |
| 2016/0227533 A1* | 8/2016 | Josiam | H04W 74/006 |
| 2017/0171723 A1* | 6/2017 | Adachi | H04L 5/0055 |
| 2018/0027591 A1 | 1/2018 | Shinohara et al. | |
| 2020/0187254 A1 | 6/2020 | Shinohara et al. | |
| 2021/0266888 A1 | 8/2021 | Lee et al. | |

FOREIGN PATENT DOCUMENTS

| | | |
|---|---|---|
| CN | 104321998 A | 1/2015 |
| JP | 2013522968 A | 6/2013 |
| KR | 1020090050913 A | 5/2009 |
| KR | 1020110048018 A | 5/2011 |
| KR | 1020120139788 A | 12/2012 |
| KR | 1020140113599 A | 9/2014 |
| WO | WO-2011/112741 A1 | 9/2011 |

OTHER PUBLICATIONS

Extended European Search Report for counterpart application EP16755469.0, EPO, Munich, dated Sep. 28, 2018.
International Preliminary Report on Patentability for PCT/JP2016/055211, dated Aug. 29, 2017.
International Search Report for PCT/JP2016/0552211, ISA/JP, Tokyo, dated May 10, 2016, with English translation thereof.
Japanese Office Action in counterpart application JP 2017-502377, JPO, dated Aug. 14, 2018, with English machine translation attached.
Jinyoung Chun, et al.; "Uplink multi-user transmission"; doc.: IEEE 11-13/1388r0, Nov. 11, 2013, (18 pages).
Korean Office Action "Notification of Reason for Refusal" in related Application KR 10-2017-7023427, KIPO, dated Nov. 26, 2018, with English translation attached.
Osama Aboul-Magd; "802.11 HEW SG Proposed PAR"; doc.: IEEE 802.11-14/0165r01, Mar. 17, 2014, (6 pages).
Tomoya Tandai et al., "Proposal of a transmission procedure of the uplink multiuser MIMO in IEEE 802.11 WLANs", Proceedings of the 2009 IEICE General Conference Tsushin 1, Mar. 17, 2009 (Mar. 17, 2009), p. 539, B-5-106.
U.S. Non-Final Office Action regarding U.S. Appl. No. 15/547,405, dated Jan. 22, 2019.
Written Opinion of the ISA for PCT/JP2016/0552211, ISA/JP, Tokyo, dated May 10, 2016.
Yasuhiko Inoue et al., Flow-Based User Pairing Scheme for Multi-User Transmissions over WLANs; Proceedings of the 11th IEEE Vehicular Technology Society Asia Pacific Wireless Communication Symposium (APWCS), issued Aug. 28-29, 2014, (5 pages).
Korean Office Action regarding KRSN 1020177023427, dated May 27, 2019.
Japanese Office Action regarding JP2018232740, dated Oct. 1, 2019.
Japanese Office Action regarding JP2018232741, dated Oct. 1, 2019.
First Chinese Office Action regarding CN2016800119836, dated Nov. 5, 2019.
Indian Office Action from counterpart IN201717026928, dated Feb. 19, 2020.
Indian Office Action regarding IN201717026928, dated Feb. 19, 2020.

* cited by examiner

TRG : TRIGGER FRAME

ANC : ANNOUNCEMENT FRAME    REQ : REQUEST FRAME    TRG : TRIGGER FRAME

REQ : REQUEST FRAME    TRG : TRIGGER FRAME

REQ : REQUEST FRAME    TRG : TRIGGER FRAME

WIRELESS COMMUNICATION SYSTEM, WIRELESS COMMUNICATION METHOD, WIRELESS LAN ACCESS POINT, AND WIRELESS LAN STATION

CROSS REFERENCE TO RELATED APPLICATION

This application is a continuation of U.S. application Ser. No. 16/787,138, filed Feb. 11, 2020, which is a continuation of Ser. No. 15/547,405, filed Jul. 28, 2017, which is a U.S. National Stage application claiming the benefit of prior filed International Application Number PCT/JP2016/055211, filed on Feb. 23, 2016, in which the International Application claims priority from Japanese Patent Application Number 2015-034352, filed on Feb. 24, 2015, the entire contents of which are incorporated herein by reference.

TECHNICAL FIELD

The present invention relates to a wireless communication system and a wireless communication method, in each of which a plurality of wireless LAN stations transmit wireless frames simultaneously to one wireless LAN access point, and the wireless LAN access point and the wireless LAN station. In the present specification, the wireless LAN station is abbreviated as "STA", and the wireless LAN access point is abbreviated as "AP".

BACKGROUND ART

Multi-user multiple input multiple output (MU-MIMO) is employed in IEEE 802.11ac, which is a wireless LAN standard, in order to efficiently perform communication in a downlink direction from the AP to the STA. In the MU-MIMO, one AP can transmit wireless frames simultaneously to a plurality of STAs. Additionally, in order to efficiently perform simultaneous transmission, a technology is also proposed that flow pairing which is effective when compared with characteristics of traffic is performed.

In Non-Patent Document 1, MU-MIMO in a downlink direction or the like, and a procedure for performing simultaneous transmission or wireless frames that are exchanged between the AP and STA when performing the simultaneous transmission are stipulated. Additionally, a procedure is also stipulated in which combinations of STAs that are destinations of the wireless frames which are transmitted with MU-MIMO are grouped, a group ID (GID) is added to each of the resulting groups of combinations, and then the resulting groups of combinations are simultaneously transmitted. In contrast, in Non-Patent Document 2, a group configuration method for performing downlink MU-MIMO that is efficient when compared with the characteristics of traffic in the downlink direction that can be collected in the AP is disclosed.

On the other hand, in order to perform efficient uplink communication from the STA to the AP, simultaneous transmission in an uplink direction by a plurality of STAs is under study. It is considered that multiple access using a space, a frequency, or domains of both makes it possible to realize the simultaneous transmission of the wireless frames from the plurality of STAs to one AP, but as disclosed in Non-Patent Document 3, this technique is not yet established in a wireless LAN system. However, in Non-Patent Document 4, a procedure is proposed in which the AP transmits wireless frame including information, such as a resource scheduling, immediately before the plurality of STAs start the simultaneous transmission and causes the wireless frame to function as a trigger for the simultaneous transmission.

Non-Patent Document 1: IEEE802.11ac, "Wireless LAN Medium Access Control (MAC) and Physical (PHY) Layer Specifications", December 2013

Non-Patent Document 2: Y. Inoue, S. Shinohara, M. Mizoguchi, and M. Morikura, "Flow-Based User Pairing Scheme for Multi-User Transmissions over WLANs," Proceedings of the 11th IEEE Vehicular Technology Society Asia Pacific Wireless Communications Symposium (APWCS), Ping Tung, Taiwan, Aug. 28-29, 2014

Non-Patent Document 3: O. Aboul-Magd, "802.11 HEW SG Proposed PAR", doc.: IEEE802.11-14/0165r1, March 2014

Non-Patent Document 4: Jinyoung Chun, Wookbong Lee, "Uplink multi-user transmission", 11-13/1388r0, LG Electronics Disclosure Problems to be Solved Although in the plurality of STAs, as disclosed in Non-Patent Document 4, the simultaneous transmission in the uplink direction can be performed using the wireless frame that is the trigger that is transmitted by the AP, it is not guaranteed that the combination of STAs performing the simultaneous transmission is necessarily for efficient transmission. For example, when the plurality of STAs perform the simultaneous transmission, it is expected that communication quality of each of the STAs deteriorates much than if a single STA performs the simultaneous transmission. For this reason, it is desirable that in the STA that performs the simultaneous transmission, characteristic degradation due to propagation of the wireless frame is sufficiently minimized. However, because there is no means of selecting the combination of STAs, although the plurality of STAs actually perform the simultaneous transmission, the likelihood that single transmission by each STA will be an efficient case is considered.

A proposition of the present invention is to provide a wireless communication system and a wireless communication method, in each of which STAs performing simultaneous transmission can be selected and the simultaneous transmission can be performed on the STAs, when wireless frames are simultaneously transmitted in a multiple access scheme from a plurality of STAs to one AP, and the wireless LAN station and the wireless LAN access point.

Means for Solving the Problems

According to a first invention, there is provided a wireless communication system in which one AP and a plurality of STAs are connected to each other, and in which a wireless frame is simultaneously transmitted from each of the plurality of STAs to the AP in a multiple access scheme, in which the AP includes a station information collection unit that collects from the plurality of STAs station information which is used for selection of STAs performing simultaneous transmission and for control of the simultaneous transmission, a simultaneous-transmission determination unit that selects a combination of STAs performing the simultaneous transmission based on the station information, and a trigger transmission unit that transmits to each of the STA performing the simultaneous transmission a trigger frame which instructs to perform the simultaneous transmission and which includes information necessary for the control of the simultaneous transmission, and in which each of the STAs that is designated by the trigger frame is configured to simultaneously transmit the wireless frame to the AP.

According to the second invention, there is provided a wireless communication system in which one AP and a plurality of STAs are connected to each other, and in which a wireless frame is simultaneously transmitted from each of the plurality of STAs to the AP in a multiple access scheme, in which a predetermined STA among the plurality of STAs includes a station information collection unit that collects from the STA itself and other STAs station information which is used for selection of STAs performing simultaneous transmission and for control of the simultaneous transmission, and a simultaneous-transmission request unit that knows occurrence of a Quality of Service (QoS) data frame based on the station information and that transmits a request frame requesting the simultaneous transmission to the AP, in which the AP includes a station information collection unit that collects from the plurality of STAs the station information which is used for the selection of the STAs performing the simultaneous transmission and for the control of the simultaneous transmission, a simultaneous-transmission determination unit that selects a combination of the STAs performing the simultaneous transmission based on the station information by reception of the request frame that is transmitted by the predetermined STA, and a trigger transmission unit that transmits to each of the STAs performing the simultaneous transmission a trigger frame which instructs to perform the simultaneous transmission and which includes information necessary for the control of the simultaneous transmission, and in which each of the STAs that is designated by the trigger frame is configured to simultaneously transmit the wireless frame to the AP.

In the wireless communication system according to the first invention or the second invention, in a case when individual CSMA/CA control is performed on each of the wireless frame destined for the STA and the trigger frame destined for the plurality of STAs performing the simultaneous transmission, the AP includes an access control unit that sets a parameter of CSMA/CA control at which transmission-waiting frames having a greater number or transmission-waiting data having a larger amount easily acquires a channel access right, and transmits the wireless frame or the trigger frame that acquired the channel access right by performing individual CSMA/CA control.

In the wireless communication system according to the first invention or the second invention, in a case when common CSMA/CA control is performed on each of the wireless frame destined for the STA and the trigger frame destined for the plurality of STAs performing the simultaneous transmission, the AP includes an access control unit that selects the wireless frame or the trigger frame having a greater number of transmission-waiting frames or a larger amount of transmission-waiting data, and transmits the wireless frame or the trigger frame being selected that acquired the channel access right by performing the common CSMA/CA control.

According to a third invention, there is provided a wireless communication method in which one AP and a plurality of STAs are connected to each other, and in which a wireless frame is simultaneously transmitted from each of the plurality of STAs to the AP in a multiple access scheme, in which the AP includes a first step collecting from the plurality of STAs station information which is used for selection of STAs performing the simultaneous transmission and for control of the simultaneous transmission, a second step selecting a combination of STAs performing the simultaneous transmission based on the station information, and a third step transmitting to each of the STAs performing the simultaneous transmission a trigger frame which instructs to perform the simultaneous transmission and which includes information necessary for the control of the simultaneous transmission, and in which each of STAs that is designated by the trigger frame simultaneously transmits the wireless frame to the AP.

According to a fourth invention, there is provided a wireless communication method in which one AP and a plurality of STAs are connected to each other, and in which a wireless frame is simultaneously transmitted from each of the plurality of STAs to the AP in a multiple access scheme, in which a predetermined STA among the plurality of STAs includes a first step collecting from the STA itself and other STAs station information which is used for selection of STAs performing simultaneous transmission and for control of the simultaneous transmission, and a second step knowing occurrence of a Quality of Service (QoS) data frame based on the station information and transmitting a request frame requesting the simultaneous transmission to the AP, in which the AP includes a first step collecting from the plurality of STAs the station information which is used for the selection of the STAs performing the simultaneous transmission and for the control of the simultaneous transmission, a second step selecting a combination of the STAs performing the simultaneous transmission based on the station information by reception of the request frame that is transmitted from the predetermined STA, and a third step transmitting to each of the STAs performing the simultaneous transmission a trigger frame which instructs to perform the simultaneous transmission and which includes information necessary for the control of the simultaneous transmission, and in which each of STAs that is designated by the trigger frame simultaneously transmits the wireless frame to the AP.

In the wireless communication method according to the third invention or the fourth invention, in a case when individual CSMA/CA control is performed on each of the wireless frame destined for the STA and the trigger frame destined for the plurality of STAs performing the simultaneous transmission, the AP sets a parameter of CSMA/CA control at which transmission-waiting frames having a greater number or transmission-waiting data having a larger amount easily acquires a channel access right, and transmits the wireless frame or the trigger frame that acquired the channel access right by performing individual CSMA/CA control.

In the wireless communication method according to the third invention or the fourth invention, in a case when common CSMA/CA control is performed on each of the wireless frame destined for the STA and the trigger frame destined for the plurality of STAs performing the simultaneous transmission, the AP selects the wireless frame or the trigger frame having a greater number of transmission-waiting frames or a larger amount of transmission-waiting data, and transmits the wireless frame or the trigger frame being selected that acquired the channel access right by performing the common CSMA/CA control.

According to a fifth invention, there is provided an AP in a wireless communication system in which one AP and a plurality of STAs are connected to each other, and in which a wireless frame is simultaneously transmitted from each of the plurality of STAs to the AP in a multiple access scheme, the AP includes a station information collection unit that collects from the plurality of STAs station information which is used for selection of STAs performing simultaneous transmission and for control of the simultaneous transmission, a simultaneous-transmission determination unit that selects a combination of STAs performing the simultaneous transmission based on the station information, and a trigger transmission unit that transmits to each of the STAs performing the simultaneous transmission a trigger frame which instructs to perform the simultaneous transmission and which includes information necessary for the control of the simultaneous transmission.

The AP according to the fifth invention, further includes, in a case when individual CSMA/CA control is performed on each of the wireless frame destined for the STA and the trigger frame destined for the plurality of STAs performing the simultaneous transmission, an access control unit that sets a parameter of CSMA/CA control at which transmission-waiting frames having a greater number or transmission-waiting data having a larger amount easily acquires a channel access right, and transmits the wireless frame or the trigger frame that acquired the channel access right by performing individual CSMA/CA control.

The AP according to the fifth invention further includes, in a case when common CSMA/CA control is performed on each of the wireless frame destined for the STA and the trigger frame destined for the plurality of STAs performing the simultaneous transmission, an access control unit that selects the wireless frame or the trigger frame that having a greater number of transmission-waiting frames or a larger amount of transmission-waiting data, and transmits the wireless frame or the trigger frame being selected that acquired the channel access right by performing the common CSMA/CA control.

According to a sixth invention, there is provided an STA in a wireless communication system in which one AP and a plurality of STAs are connected to each other, and in which a wireless frame is simultaneously transmitted from each of the plurality of STAs to the AP in a multiple access scheme, the STA includes a station information collection unit that collects from an STA itself and other STAs station information which is used for selection of STAs performing simultaneous transmission and for control of the simultaneous transmission, and a simultaneous-transmission request unit that knows occurrence of a QoS data frame by the station information and transmits a request frame requesting the simultaneous transmission to the AP.

Effects

According to the present invention, occurrence of a QoS data frame in an STA makes the STA selected as STAs performing simultaneous transmission, and a plurality of STAs that are announced with a trigger frame can start the simultaneous transmission in a multiple access scheme at a suitable timing. Additionally, according to the present invention, selection of a combination of STAs that has good data transmission efficiency of simultaneous transmission can improve throughput of the simultaneous transmission.

DETAILED DESCRIPTION OF THE EMBODIMENTS

Figure 1:
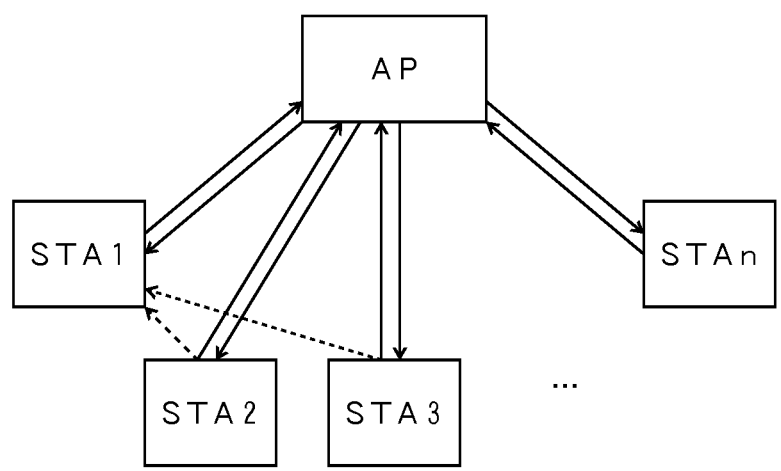
FIG. 1 is a diagram illustrating an example of a configuration of a wireless communication system according to the present invention.

FIG. 1 illustrates an example of a configuration of a wireless communication system according to the present invention.

In FIG. 1, one AP and a plurality of STAs, STA 1 to STA n are connected to each other. A slid line indicates that transmission and reception of a wireless frame is possible between the AP and each of the STA 1 to STA n. A dashed line illustrates that it is possible that the STA 1 receives wireless frames that are transmitted by the STA 2 and the STA 3.

Figure 2:
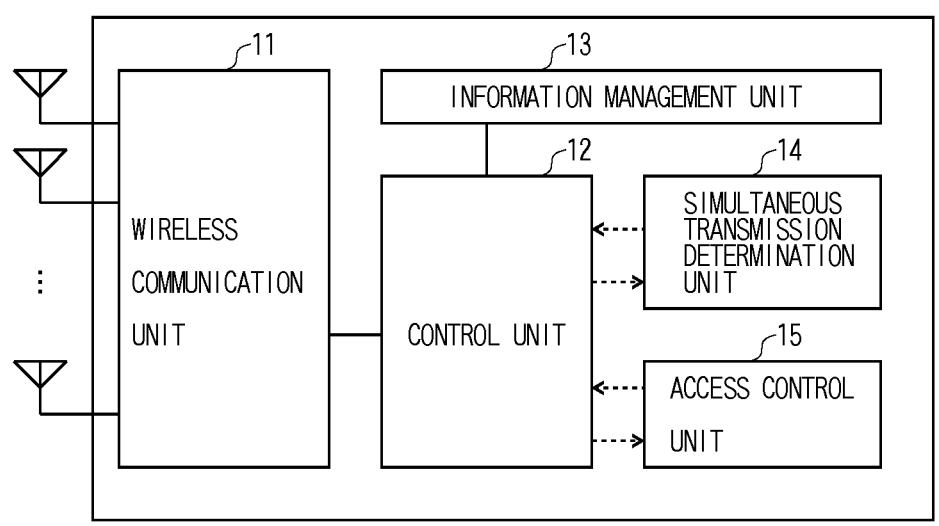
FIG. 2 is a diagram illustrating an example of a configuration of an AP and an STA in the wireless communication system according to the present invention.

FIG. 2 illustrates an example of a configuration of the AP and the STA in the wireless communication system according to the present invention.

In FIG. 2, an AP and an STA each are configured with a wireless communication unit 11 that perform multiple access processing during transmission and reception of a wireless frame and simultaneous transmission, a control unit 12 that performs general control which includes control of the transmission and reception of the wireless frame, an information management unit 13 that manages information necessary for each control, a simultaneous transmission determination unit 14 that collects station information of each STA, determines whether selection of a combination of STAs performing the simultaneous transmission and data transmission efficiency of the simultaneous transmission are good or bad, and generates a trigger frame for announcing information necessary for control of the simultaneous transmission to the STAs performing the simultaneous transmission, and an access control unit 15 that acquires a channel access right to a wireless frame by performing Carrier Sense Multiple Access with Collision Avoidance (CSMA/CA) control. At this point, wireless frames include control signals, such as a downlink data frame that is transmitted by the AP, an uplink data frame that is transmitted by the STA, station information that is used for the control of the simultaneous transmission by the STA, an announcement frame, a request frame, and a trigger frame.

Embodiments will be described below with reference to control sequences according to first to fourth embodiments, which are illustrated in FIGS. 3 to 6, and procedure for the control of the simultaneous transmission according to the first to fourth embodiments, which are illustrated in FIGS. 7 to 10.

First Embodiment

Figure 3:
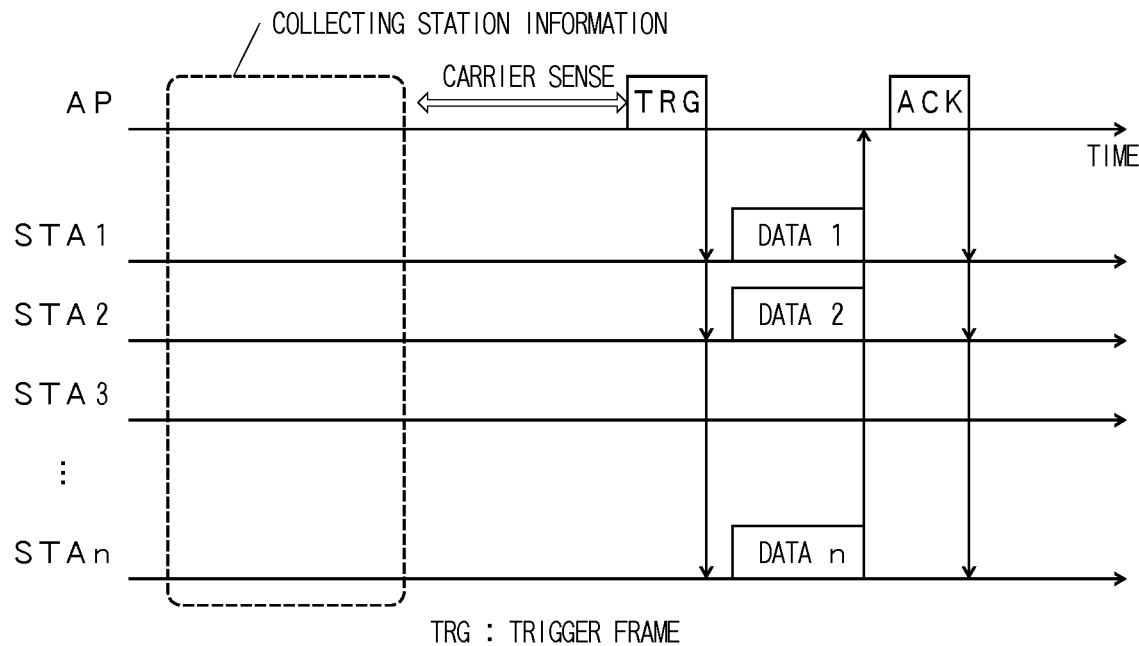
FIG. 3 is a diagram illustrating a control sequence according to a first embodiment in the wireless communication system according to the present invention.

FIG. 3 is the control sequence according to the first embodiment in the wireless communication system according to the present invention.

Figure 7:
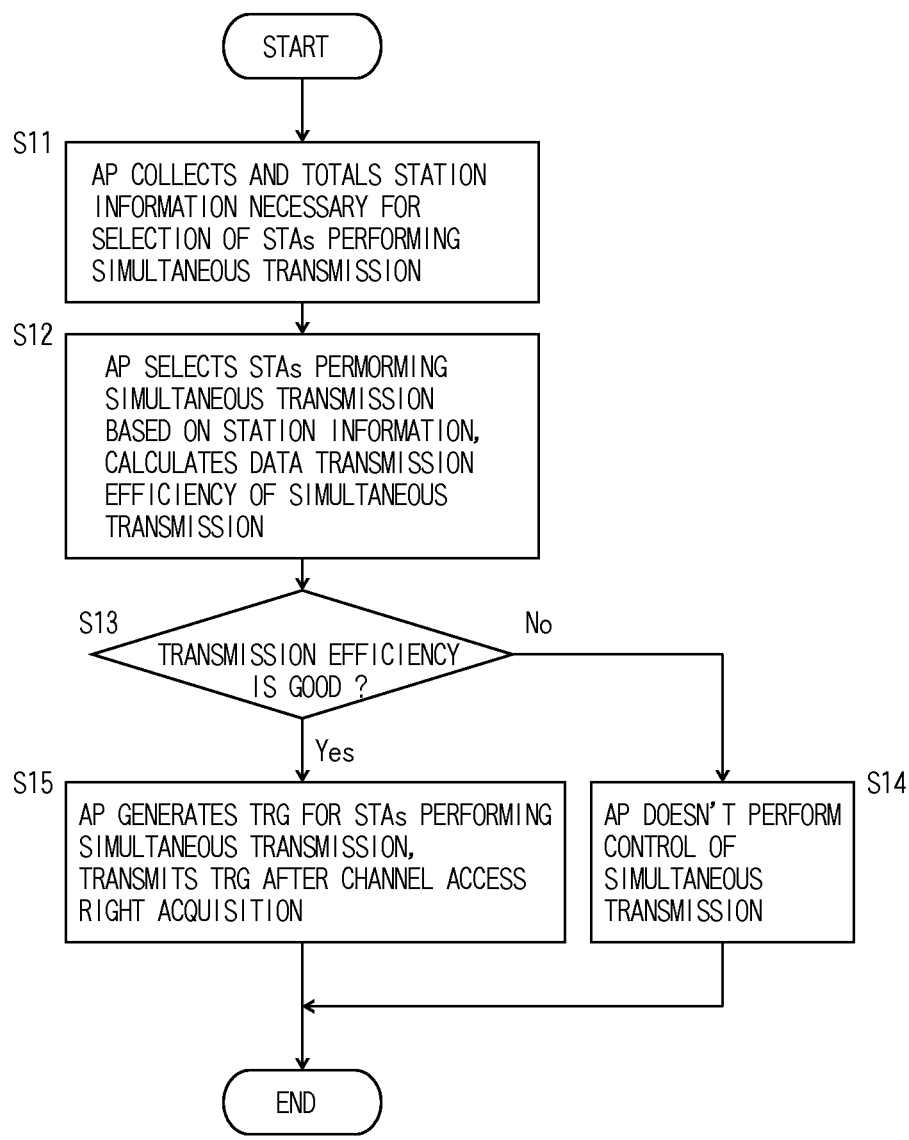
FIG. 7 is a flowchart illustrating a simultaneous transmission control procedure for an AP according to a first embodiment in the wireless communication system according to the present invention.

FIG. 7 illustrates Steps S11 to S15 as the procedure for the control of the simultaneous transmission according to the first embodiment in the wireless communication system according to the present invention.

In Step S11, the AP collects pieces of station information of the STA 1 to STA n necessary for the selection of the STAs performing the simultaneous transmission and for the control of the simultaneous transmission and totals collected pieces of station information. The station information are traffic information in each STA, or propagation characteristic information such as a received power or a channel status from each STA.

Examples of the traffic information in each STA include pieces of information relating to the presence or absence of a transmission packet, the numbers of transmission packets, a bit size of the transmission packet in an access category that has high priority, the presence or absence of a packet with a threshold or above in a transmission queue, an application type of the transmission packet, a generation rate of user data that is generated in the STA, the frequency with which the user data occurs, the presence or absence of the transmission packet that occurs periodically, and the like. The STA includes information, such as a packet length of a data frame or an amount of packet bits in an uplink, in the station information, and thus can cause a length of a Network Allocation Vector (NAV) period to be decided when the AP sets the NAV that is a period of time for prevention of the packet transmission. In addition, occurrence of traffic in the uplink direction is predicted from an application type of traffic in the downlink direction from the AP, and thus can be used for the selection of the combination of the STAs performing the simultaneous transmission. For example, if an application, such as Voice over IP (VoIP), is used, it can be predicted that, when the transmission packet periodically occurs in the downlink direction, the same transmission packet occurs also in the uplink direction. Additionally, during a fixed period of time, the AP collects a statistical value of uplink traffic on the STA, and predicts the presence and absence of the uplink traffic that occurs periodically, and thus can use results of the collection and prediction for the selection of the STAs performing the simultaneous transmission.

Furthermore, when a plurality of STAs perform the simultaneous transmission, more deterioration in communication quality of each of the STAs is expected than compared with a case of transmitting STA alone. Therefore, when conducting simultaneous transmission, it is desirable to combine STAs in which characteristic degradation due to propagation of wireless frames to become sufficiently small. Results of predicting quality of propagation channel between the STA and the AP from a received-power value of a frame transmitted by the STA, or the characteristics between each of the plurality of STAs are compared with each other, in order to determine this propagation characteristic, and station information on whether the STAs that have equal receiving power values when performing the simultaneous transmission are present or not can also be used for the determination of the simultaneous transmission.

At this point, as a method of collecting the station information, it is possible to employ a method in which a frame including the station information is caused to be transmitted periodically or voluntarily from each STA, a method in which the STAs are caused to make replay in order according to polling by the AP, a method in which the station information is caused to be carried in the uplink data frame from each STA, or a method in which the station information is caused to be carried, as a response frame corresponding to the downlink data frame, for example, in an ACK. If the station information is included in the uplink data frame, the station information is included in data frames for multiple-user simultaneous transmission in the uplink direction, and thus the AP can continuously perform the simultaneous-transmission communications for a plurality of users according to the present invention. Furthermore, information within a QoS control field that is stipulated in IEEE 802.11e may be used to know that a QoS data frame occurs in the STA. Furthermore, a network other than a wireless LAN, such as a mobile network or a wired network, may be used to collect the station information in the background. For example, IEEE 802.11k or the like, or other information exchange sequences may be utilized.

It is noted that an aspect is that not only may pieces of station information of all the STAs be collected in the AP, but also only the STA which has the uplink traffic transmits the station information to the AP. Furthermore, an aspect is that, if a predetermined STA collects pieces of station information of other STAs as in third and fourth embodiments that will be described below, only station information of STAs that the predetermined STA is capable of hearing may be collected.

Next, in Steps S12 and S13, the AP selects the combination of STAs performing the simultaneous transmission based on the collected station information, calculates data transmission efficiency of the simultaneous transmission, and determines whether the calculated data transmission efficiency is good or bad. Before it comes to the calculation of the data transmission efficiency, a combination of STAs that have high similarity is selected based on a frame size of the uplink traffic that occurs in each STA, an interval at which a transmission packet occurs, an access category of the transmission packet, propagation characteristic, a data rate that is decided from a transmission capability of each of the STAs, and the like, and the data transmission efficiency of the simultaneous transmission that result from the combination of STAs is calculated. Then, compares the data transmission efficiency of the simultaneous transmission by the selected combination of STAs with the data transmission efficiency by a single STA, and if a value of the former is high, it is determined that the data transmission efficiency of the simultaneous transmission is good. Alternatively, the AP compares the data transmission efficiency of the simultaneous transmission by the selected combination of STAs with a predetermined threshold, so that the AP may determine whether the data transmission efficiency of the simultaneous transmission is good or bad.

As a result, if the data transmission efficiency of the simultaneous transmission is not good, in Step S14, the AP may not perform the control of the simultaneous transmission in the uplink. On the other hand, if it is determined that the data transmission efficiency of the simultaneous transmission is good, in Step S15, the AP generates a trigger frame TRG instructing to perform the uplink simultaneous transmission to the selected STAs performing the simultaneous transmission, performs carrier sensing under the CSMA/CA control to acquire the channel access right, and then transmits the trigger frame.

It is noted that during channel access right acquisition processing in Step S15, processing may be performed that assumes the time that it takes for a request-to-send (RTS) and clear-to-send (CTS) frame in the CSMA/CA control to be transmitted and received and for the selected STAs to complete the simultaneous transmission, sets the NAV which prevents other STAs from performing the transmission, and so forth.

In the trigger frame transmitted by the AP which acquired, the channel access right are the combination of STAs performing the simultaneous transmission selected based on the station information collected to determine the simultaneous transmission, wireless communication resource information available for each STA, and information necessary for adjusting frequency and timing are included. Moreover, in the trigger frame, for example, a modulation method performing the simultaneous transmission and penalty information for decreasing a coding rate may also be included.

The STAs that is instructed to perform the simultaneous transmission with the trigger frame transmitted by the AP, for example, the STA 1 to STA n that are illustrated in FIG. 3, performs the simultaneous transmission based on information that is designated, using any one of Frequency Division Multiple Access (FDMA), Spatial Division Multiple Access (SDMA or MU-MIMO), and other Multiple Access, or using a combination of these.

Incidentally, the AP transmits the downlink data frame to the STA after the channel access right is acquired based on the CSMA/CA control. Therefore, in the access control unit 15 of the AP that is illustrated in FIG. 2, an adjustment needs to be made to the CSMA/CA control for the transmission of the downlink data frame and the CSMA/CA control for the transmission of the trigger frame instructing to perform the simultaneous transmission of the uplink data frame.

At this point, if priority control in accordance with the access category is performed on the downlink data frame, a configuration is considered in which the priority control in accordance with the access category of the uplink data frame that is simultaneously transmitted is performed also on the trigger frame. This priority control in accordance with the access category is performed by setting a parameter of the CSMA/CA control.

In Enhanced Distributed Channel Access (EDCA) control that results from enhancing the CSMA/CA control, the AIFS time in accordance with the access category AC is used instead of the DIFS time which is the time until determining that the channel is in the idle state. For example, the AIFS time is set shorter for access categories with higher priority. $CW_{min}$ that is a minimum value of a Contention Window (CW) that decides a random backoff value of collision avoidance, and $CW_{max}$ that is a maximum value are also set in accordance with the access category. For example, the higher priority the access category has, the smaller value $CW_{min}$ and $CW_{max}$ are set to. Furthermore, Transmission Opportunity (TXOP) that is a parameter that indicates a period of time for which a channel is used exclusively after the channel access right is acquired is also set according to the access category. For example, as a priority of the access category become higher, the value of TXOP becomes larger and the number of frames that can be transmitted after the acquisition of the channel access right increases.

If AIFS, $CW_{min}$, $CW_{max}$, and TXOP that are described above, which are EDCA parameters, are adjusted and thus the priority control in accordance with the access category is performed, the priority control between the downlink data frame and the trigger frame is necessary for every access category. For example, in the case of a first configuration in which individual CSMA/CA control is performed, for every access category, on the downlink data frame and the trigger frame, an EDCA parameter, at which the downlink data frame or the trigger frame that has the greater number of transmission-waiting frames or a larger amount of transmission-waiting data easily acquires a channel access right, is set for every access category. The details will be described below with reference to FIG. 11.

Furthermore, in the case of a second configuration in which common CSMA/CA control is performed, for every access category, on the downlink data frame and the trigger frame, a selection unit is provided in such a manner that, for every access category, the downlink data frame or the trigger frame that has the greater number of transmission-waiting frames or a larger amount of transmission-waiting data is selected and the CSMA/CA control is performed. The details will be described below with reference to FIG. 12.

Figure 11:
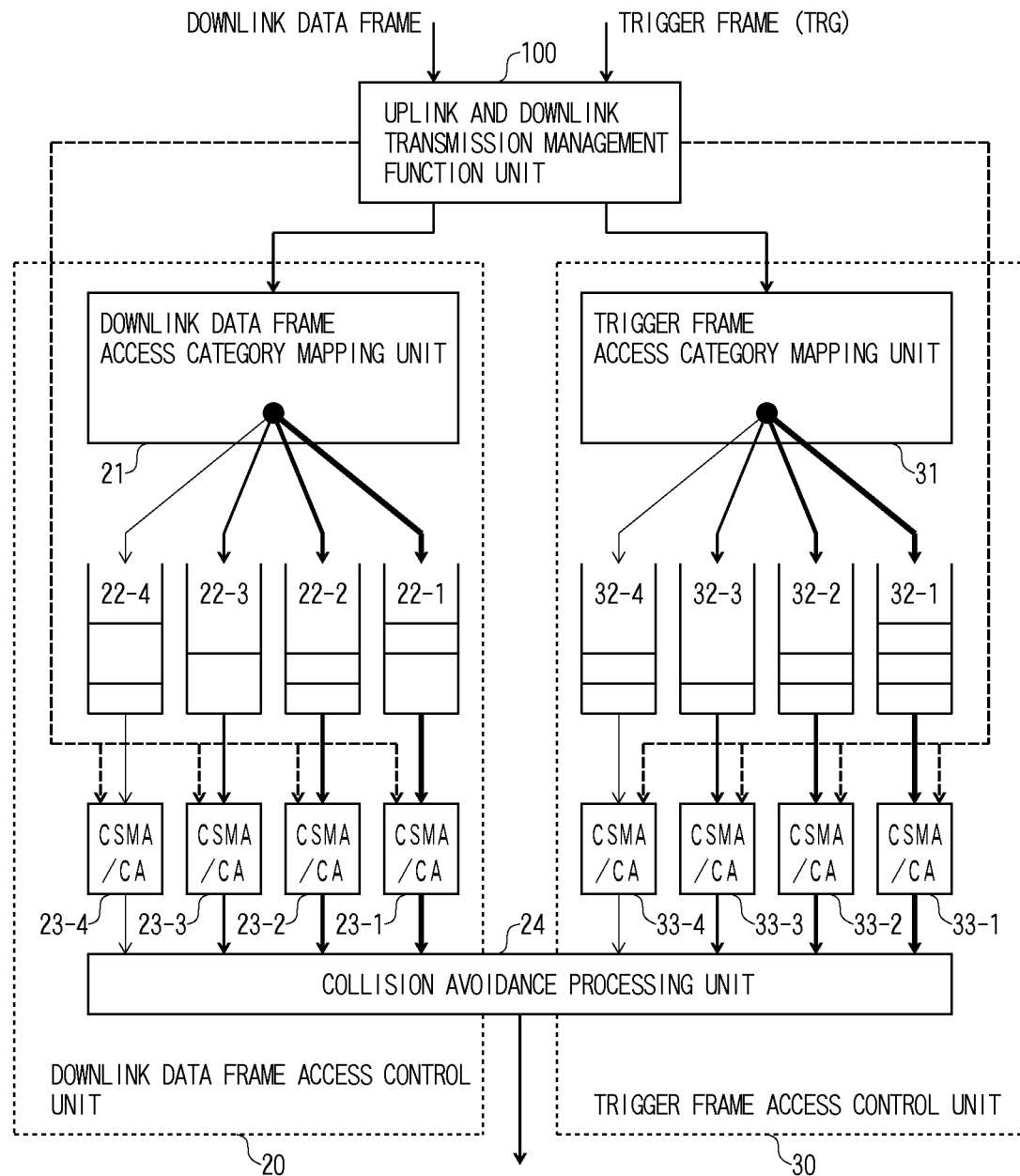
FIG. 11 is a diagram illustrating a first configuration of an access control unit 15.

FIG. 11 illustrates the first configuration of the access control unit 15.

In FIG. 11, an uplink and downlink transmission management function unit 100 inputs the downlink data frame in the AP, and the trigger frame instructing to perform the uplink simultaneous transmission sums up a number of frames and data amounts for every access category, inputs the downlink data frame into a downlink data frame access control unit 20, and input the trigger frame into a trigger frame access control unit 30.

The downlink data frame access control unit 20 has a configuration that is stipulated in IEEE 802.11e, and is configured with a downlink data frame access category mapping unit 21, transmission queues 22-1 to 22-4 and CSMA/CA control units 23-1 to 23-4, each of which correspond to access categories, respectively, and a collision avoidance processing unit 24. The downlink data frame access category mapping unit 21 inserts the downlink data frame into the transmission queues 22-1 to 22-4 in accordance with the access categories, respectively. In the CSMA/CA control units 23-1 to 23-4, access control is performed on the downlink data frame that waits in each transmission queue, in order of priority that is based on the EDCA parameter in accordance with the access category.

The trigger frame access control unit 30 has the same configuration as the downlink data frame access control unit 20, and is configured with a trigger frame access category mapping unit 31, transmission queues 32-1 to 32-4 that correspond to the access categories, respectively, CSMA/CA control units 33-1 to 33-4 that correspond to the access categories, respectively, and the collision avoidance processing unit 24. The trigger frame access category mapping unit 31 inserts the trigger frame into the transmission queues 32-1 to 32-4 in accordance with the access categories, respectively. In the CSMA/CA control units 33-1 to 33-4, the access control is performed on the trigger frame that waits in each transmission queue, in order of priority that is based on the EDCA parameter in accordance with the access category.

It is noted that a default value of the EDCA parameter in accordance with an access category i may be set, in a common-use manner, for CSMA/CA control units 23-*i* and 33-*i* in accordance with the access category i, and that, in the case of the same access category i, for example a weighting may be applied to the default value of the EDCA parameter in such a manner that the access control of the trigger frame takes precedence. At this point, i ranges from 1 to 4.

Additionally, based on a result of summing up a number of frames and data amounts in terms of each of the downlink frame and the trigger frame for every access category, the uplink and downlink transmission management function unit 100 causes the CSMA/CA control units 23-*i* and 33-*i* in accordance with the same access category i to make an adjustment of the EDCA parameter at which, with a larger number of transmission-waiting frames or a larger amount of transmission-waiting data in transmission queues 22-*i* and 32-*i*, the channel access right is easy to acquire.

The collision avoidance processing unit 24 is common to the downlink data frame access control unit 20 and the trigger frame access control unit 30. When transmission timings overlap due to the access control of each access category, the collision avoidance processing unit 24 performs the access control of the access category that has a higher priority, but, for example, may preferentially perform the access control of the trigger category between the downlink data frame and the trigger frame in the same access category.

Figure 12:
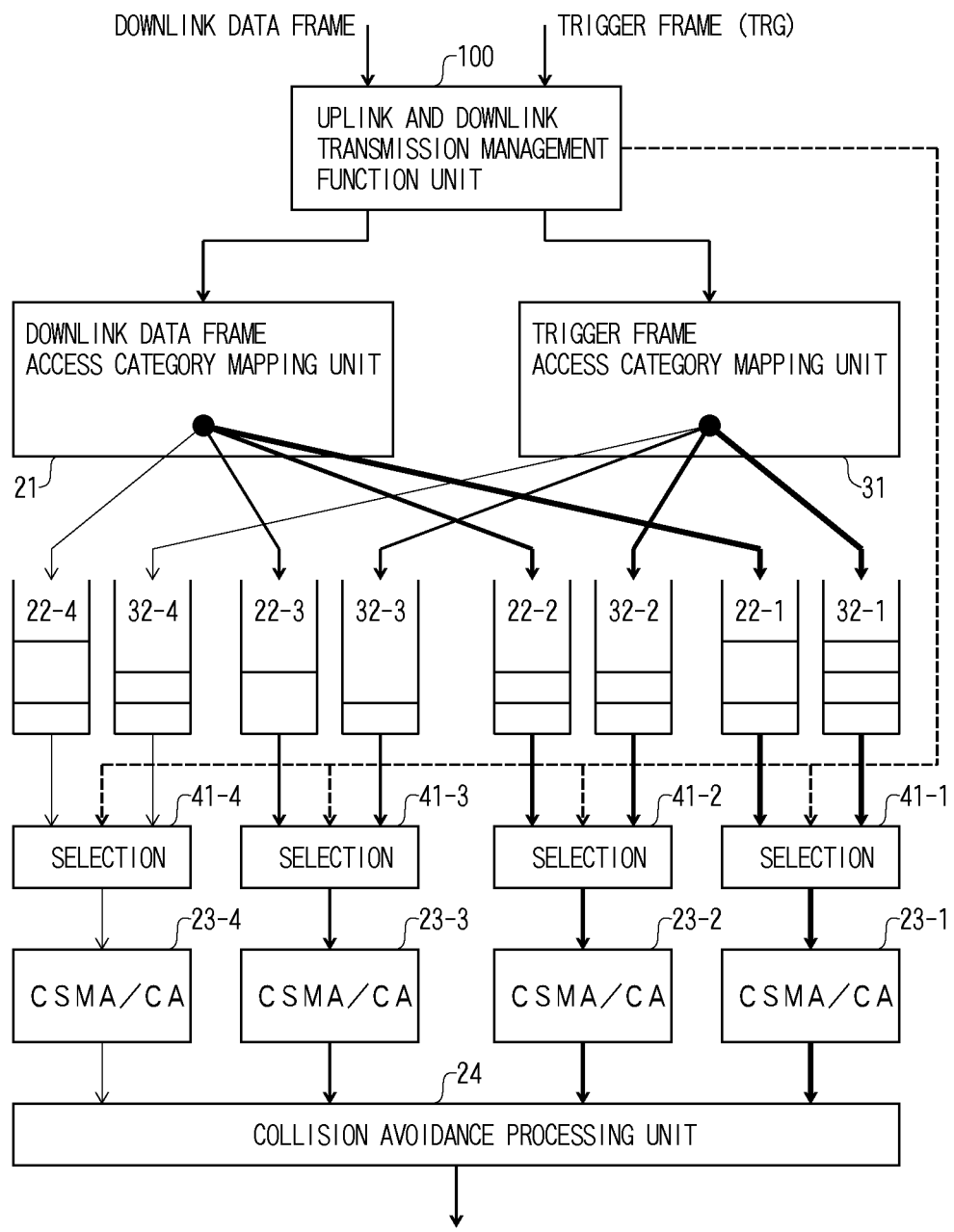
FIG. 12 is a diagram illustrating a second configuration of the access control unit 15.

FIG. 12 illustrates the second configuration of the access control unit 15.

In FIG. 12, the second configuration has the CSMA/CA control units 23-1 to 23-4 of the downlink data frame access control unit 20 and the CSMA/CA control units 33-1 to 33-4 of the trigger frame access control unit 30 in common with the first configuration.

The uplink and downlink transmission management function unit 100 inputs the downlink data frame in the AP, and the trigger frame instructing to perform the uplink simultaneous transmission sums up a number of frames and data amounts for every access category, inputs the downlink data frame into the downlink data frame access category mapping unit 21, and inputs the trigger frame into the trigger frame access category mapping unit 31.

The downlink data frame access category mapping unit 21 inserts the downlink data frame into the transmission queues 22-1 to 22-4 in accordance with the access categories, respectively. The trigger frame access category mapping unit 31 inserts the trigger frame into the transmission queues 32-1 to 32-4 in accordance with the access categories, respectively. One of the downlink data frames that wait in the transmission queue 22-*i* in the access category i and the trigger frame that waits in the transmission queue 32-*i* is selected through a selection unit 41-*i*, and, in the CSMA/CA control unit 23-*i*, the access control is performed on the selected frame in order of priority that is based on the EDCA parameter in accordance with the access category i.

Based on the result of summing up a number of frames and data amounts in terms of each of the downlink data frame and the trigger frame for every access category, the uplink and downlink transmission management function unit 100 causes the selection unit 41-*i* in accordance with the access category i to select the downlink data frame or the trigger frame that has the greater number of transmission-waiting frames or a larger amount of transmission-waiting data in the transmission queues 22-*i* and 32-*i*, and causes the CSMA/CA control unit 23-*i* to perform the access control. In the first configuration, because the EDCA parameters for the CSMA/CA control units 23-*i* and 33-*i* are adjusted, the probability that each of the downlink data frame and the trigger frame will be selected depends on a statistical probability at which the random backoff values are the same, but in the second configuration, one of the downlink data frame and the trigger frame is definitely selected according to the number of frames or the data amount at the time of waiting the transmission.

When the transmission timings overlap due to the access control of each access category, a collision avoidance processing unit 41 performs the access control of the access category that has a higher priority. It is noted that the overlapping of the transmission timings due to the access control occurs also if there are a trigger frame and a downlink data frame in different access categories and if there are trigger frames or downlink data frames in different access categories.

As described above, in the access control unit 15 of the AP, if the trigger frame is transmitted that is destined for a plurality of STAs that simultaneously transmit the downlink data frame or the uplink data frame which is destined for the STA, the trigger frame is transmitted after the channel access right is acquired based on the CSMA/CA control. On the other hand, also in the STA, if the uplink data frame is transmitted, the uplink data frame is transmitted after the channel access right is acquired based on the CSMA/CA control. At this point, for example, if a plurality of STAs that make transmission requests to one AP are present, if each performs the CSMA/CA control, the probability that the AP will acquire the channel access right decreases remarkably. In contrast, the simultaneous transmission of the uplink data frame by the plurality of STAs cancel the transmission request by each STA and further make it easy for the AP to acquire the channel access right, but this is a case where the trigger frame can be transmitted efficiently.

In the first configuration that is illustrated in FIG. 11, when a weighting is applied to the default value of the EDCA parameter in accordance with each access category in such a manner that the access control of the trigger frame takes precedence, the EDCA parameter may be adjusted according to the number of STAs that make the transmission requests. For example, if bidirectional traffic occurs, a CW size in the AP is set to be smaller than a default value, or the CW size is set to be larger than the default value for the STA that is capable of being connected to the AP or the STAs performing the simultaneous transmission, using a beacon frame or other frames on a wireless or wired network, and thus the AP that performs the carrier sensing in order to transmit the trigger frame for the simultaneous transmission can preferentially start the transmission.

Second Embodiment

Figure 4:
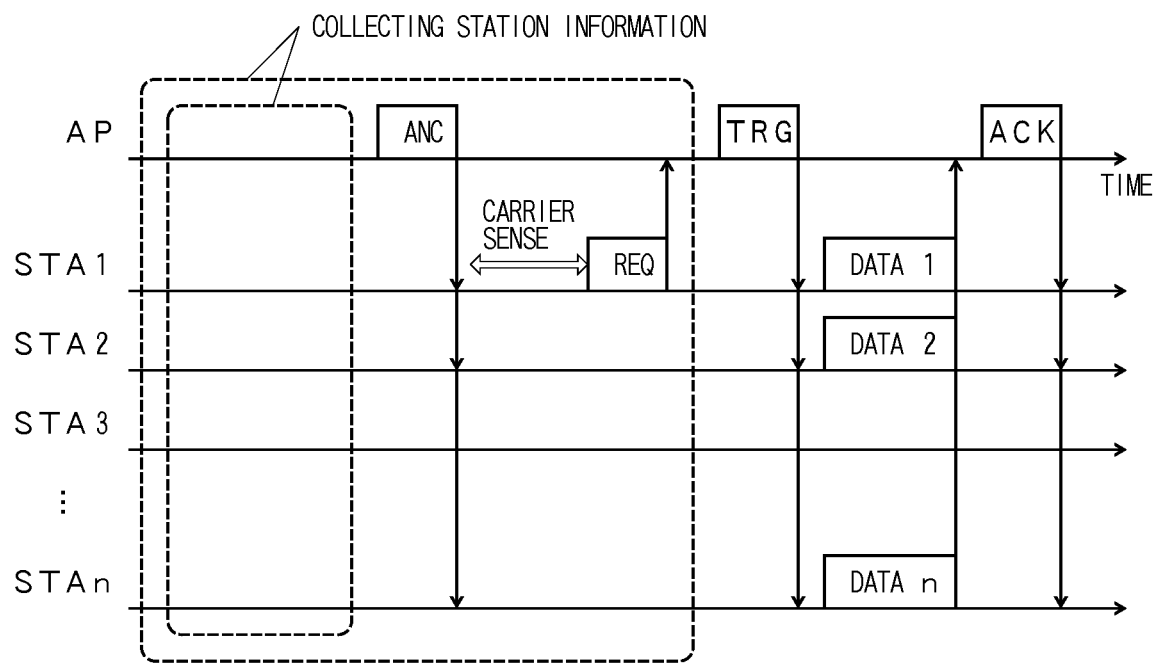
FIG. 4 is a diagram illustrating a control sequence according to a second embodiment in the wireless communication system according to the present invention.

FIG. 4 is a control sequence according to a second embodiment in the wireless communication system according to the present invention.

Figure 8:
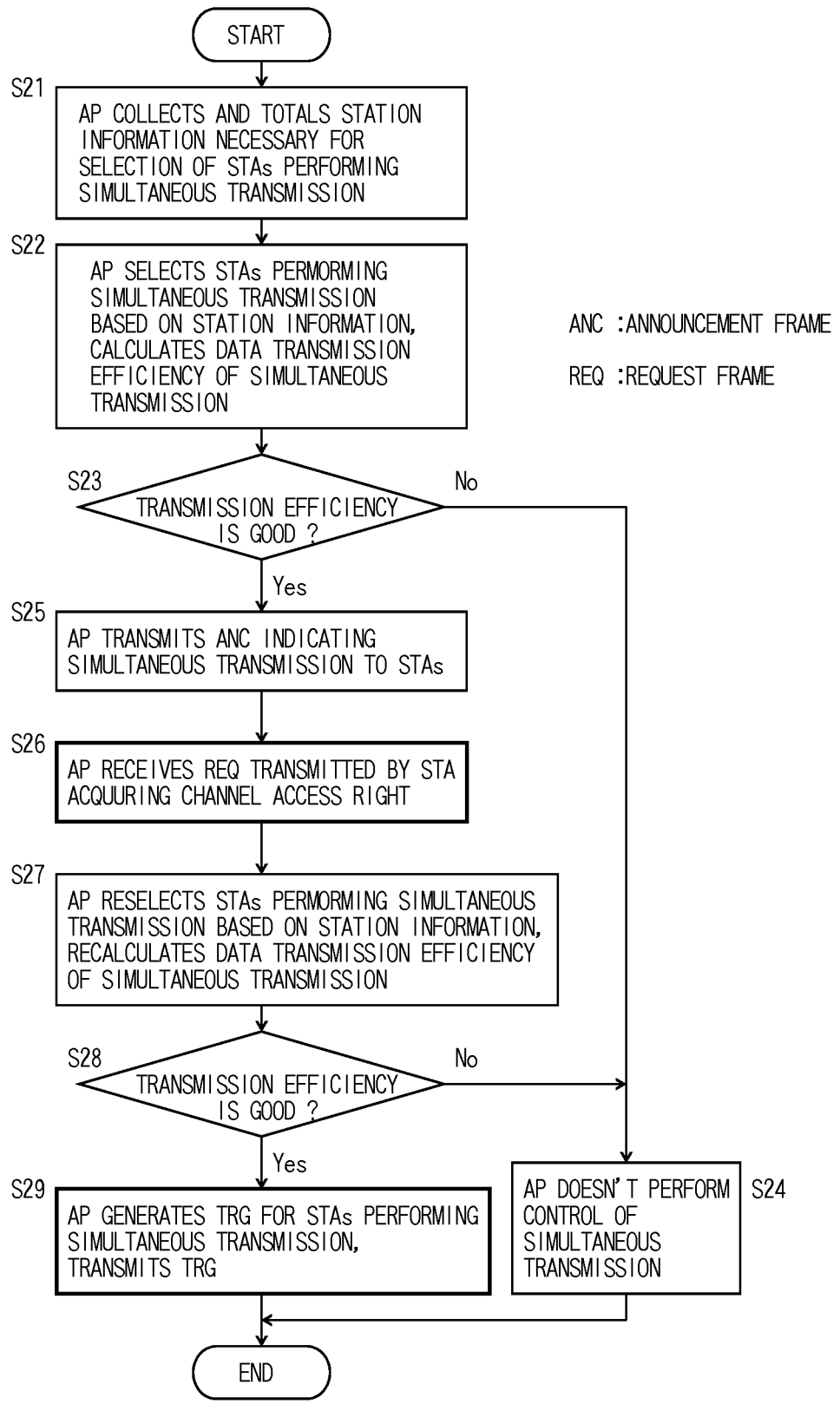
FIG. 8 is a flowchart illustrating a simultaneous transmission control procedure for an AP according to a second embodiment in the wireless communication system according to the present invention.

FIG. 8 illustrates Steps S21 to S29 as a procedure for control of simultaneous transmission according to the second embodiment in the wireless communication system according to the present invention.

In Step S21, the AP collects pieces of station information of the STA 1 to STA n necessary for the selection of the STAs performing the simultaneous transmission and for the control of the simultaneous transmission and totals collected pieces of station information. Next, in Steps S22 and S23, the AP selects the combination of STAs performing the simultaneous transmission based on the collected station information, calculates the data transmission efficiency of the simultaneous transmission, and determines whether the calculated data transmission efficiency is good or bad. At this point, if it is not determined that the data transmission efficiency of the simultaneous transmission is good, in Step S24, the AP does not perform the control of the simultaneous transmission in the uplink. The processing described above is the same in each of Steps S11 to S14 in the first embodiment, which is illustrated in FIG. 7.

In the present embodiment, if it is determined in Step S23 that the data transmission efficiency of the simultaneous transmission is good, the AP causes the STA side to acquire the channel access right before transmitting the trigger frame instructing to perform the uplink simultaneous transmission to the STAs performing the simultaneous transmission.

At this point, when the AP determines that the data transmission efficiency of the simultaneous transmission is good, in Step S25, the AP transmits announcement frames indicating that the simultaneous transmission has become possible to the STAs performing the simultaneous transmission. Among the STAs that receive the announcement frames, the STA that acquires the channel access right with the carrier sensing and random backoff control transmits the request frame to the AP. In an example in FIG. 4, the STA 1 transmits the request frame. In Step S26, the AP receives the request frame transmitted by the STA which acquired the channel access right, in Steps S27 and S28, the AP reselects a combination of STAs performing the simultaneous transmission based on collected pieces of station information, recalculates data transmission efficiency of the simultaneous transmission, and determines whether the recalculated data transmission efficiency is good or bad. At this time, if the station information is updated, there is also a case where a combination of STAs different from the combination of STAs that is selected in Step S22 is selected. Furthermore, because the STA that acquired the channel access right and transmitted the request frame is in an idle status, one of the STAs performing the simultaneous transmission may be decided definitely.

As a result, if it is not determined that the data transmission efficiency of the simultaneous transmission is good, in Step S24, the AP does not perform the control of the simultaneous transmission in the uplink. On the other hand, if it is re-determined that the data transmission efficiency of the simultaneous transmission is good, in Step S29, the AP generates the trigger frame instructing to perform the uplink simultaneous transmission for the selected STAs performing the simultaneous transmission, and transmits the generated trigger frame.

It is noted that, when the STA that received the announcement frame acquires the channel access right and transmits a request frame, and when the AP that received the request frame intends to transmit the trigger frame after the SIFS time, the trigger frame can be reliably transmitted by the channel access right acquired by the STA, and the simultaneous transmission can be started. Furthermore, when a time it takes from the AP to receive the request frame and transmit the trigger frame until the STAs complete the simultaneous transmission is assumed and when the NAV is set to other STAs that are not selected as the STAs performing the simultaneous transmission by the request frame transmitted by the STA or by an RTS/CTS frame transmitted and received separately, the STAs selected by the trigger frame of the AP can reliably perform the simultaneous transmission.

Third Embodiment

Figure 5:
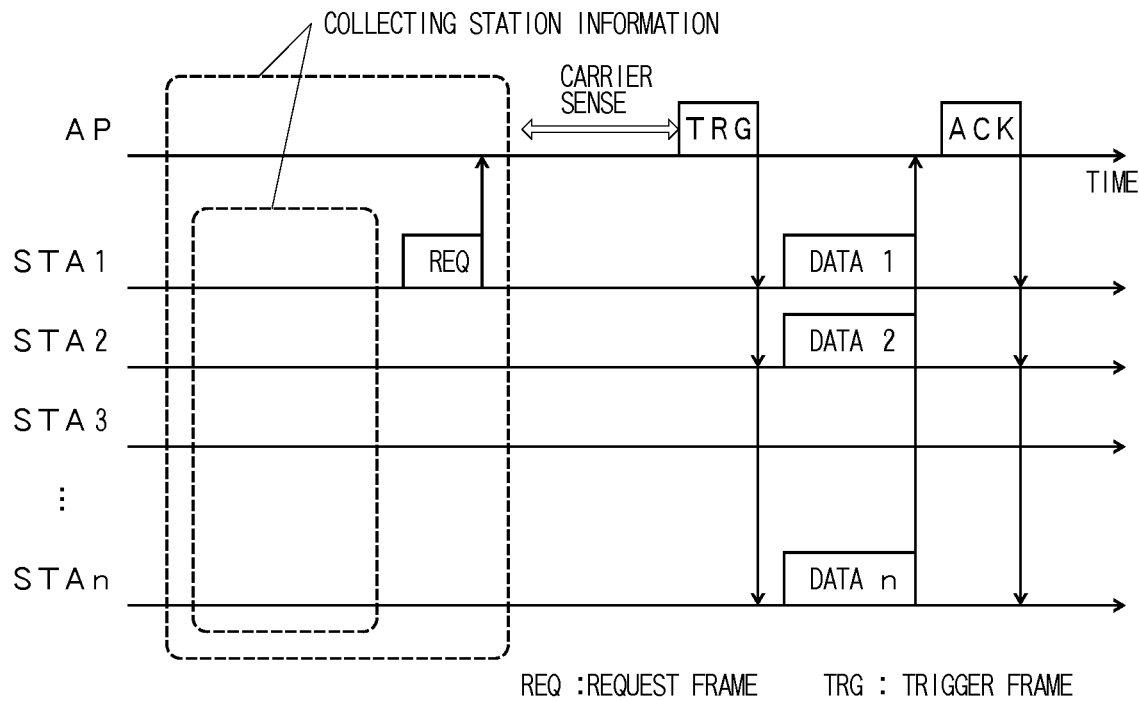
FIG. 5 is a diagram illustrating a control sequence according to a third embodiment in the wireless communication system according to the present invention.

FIG. 5 is a control sequence according to a third embodiment in the wireless communication system according to the present invention.

Figure 9:
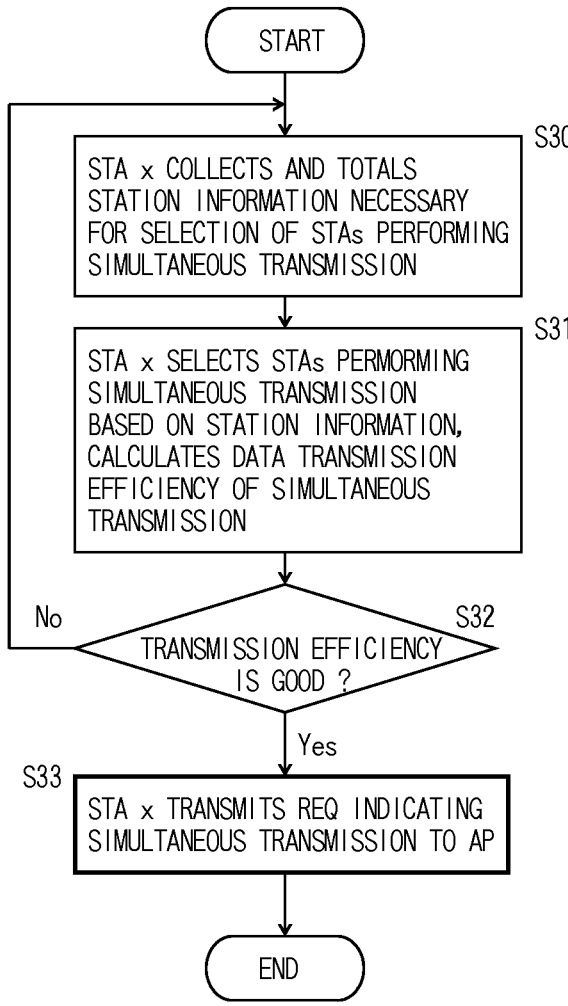
FIG. 9 is a flowchart illustrating a simultaneous transmission control procedure for an STA and an AP according to a third embodiment in the wireless communication system according to the present invention.
Figure 9:
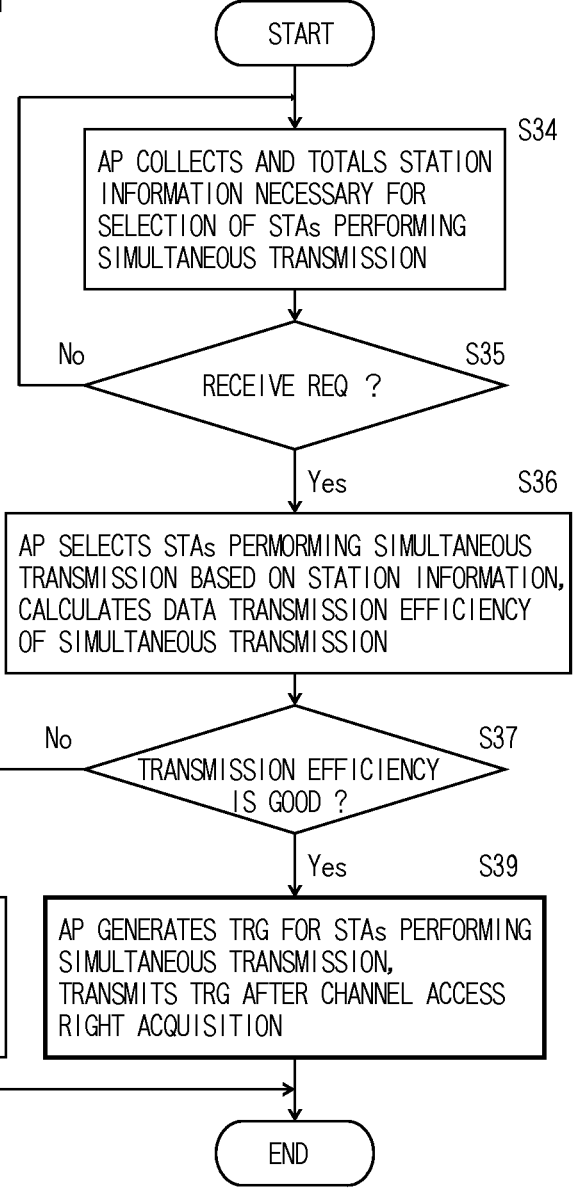

FIG. 9 illustrates Step S30 to S33 in which processing operations by the STA are performed and Steps S34 to S39 in which processing operations by the AP are performed, as a procedure for control of simultaneous transmission according to the third embodiment in the wireless communication system according to the present invention.

The first and second embodiments are the procedures in each of which the AP collects and totals pieces of station information of STAs and selects the combinations of STAs performing the simultaneous transmission, but in the third embodiment, a predetermined STA x collects and totals pieces of station information of the STA x itself and other STAs, determines whether or not the simultaneous transmission are possible, and announces a result of the determination to the AP, and the AP selects the combination of STAs performing the simultaneous transmission according to the announcement. For example, a case where the STA 1 that is illustrated in FIG. 1 hears uplink frames of the STA 2 and the STA 3, and collects these pieces of traffic information as pieces of station information. Alternatively, the STA 1 may collect pieces of station information of other STA 2 to STA n using the technique of the AP which is described in the first embodiment. However, as in the first embodiment, the AP is also assumed to independently collect pieces of station information of the STA 1 to the STA n.

In Step S30, the predetermined STA x collects and totals pieces of station information necessary for the selection of the STAs performing the simultaneous transmission and the control of the simultaneous transmission. Next, in Steps S31 and S32, the STA x selects the combination of STAs performing the simultaneous transmission based on the pieces of station information of the STA x itself and other STAs, calculate the data transmission efficiency of the simultaneous transmission, and determines whether the calculated data transmission efficiency is good or bad, and if it is not determined that the data transmission efficiency of the simultaneous transmission is good, returns to Step S31 to perform recollection of the pieces of station information. On the other hand, if it is determined that the data transmission efficiency of the simultaneous transmission is good, in Step S33, the STA x transmits the request frame indicating that the simultaneous transmission is possible to the AP. It is noted that, in the request frame, pieces of combination information or pieces of station information of the STAs performing the simultaneous transmission, a request for the acquisition of the channel access right to the AP, and a request for including the STA itself in the multiple-user simultaneous transmission in the uplink direction may be included. Furthermore, when the STA x knows that QoS data frames of the STA itself and other STAs occur, the STA x may transmit the request frame to the AP.

On the other hand, in Step S34, the AP collects pieces of station information necessary for the selection of the STAs performing the simultaneous transmission and for the control of the simultaneous transmission from among the STA 1 to STA n and totals collected pieces of station information. When in Step S35, the request frame is received from the STA, in Steps S36 and S37, the AP selects a combination of STAs performing the simultaneous transmission based on collected pieces of station information, calculates data transmission efficiency of the simultaneous transmission, and determines whether the calculated data transmission efficiency is good or bad. At this time, if combination information or station information of the STAs performing the simultaneous transmission which is determined in the STA is included in the request frame that is transmitted by the STA, the combination information and the station information may be used in conjunction with the station information collected by the AP for the processing that selects the combination of STAs performing the simultaneous transmission. Furthermore, if the station information is updated, there is also a case where a combination of STAs different from the combination of STAs that is selected in Step S31 is selected.

As a result, if it is not determined that the data transmission efficiency of the simultaneous transmission is good, in Step S38, the AP does not perform the control of the simultaneous transmission in the uplink. On the other hand, if it is determined that the data transmission efficiency of the simultaneous transmission is good, in Step S39, the AP generates a trigger frame TRG instructing to perform the uplink simultaneous transmission for the selected STAs performing the simultaneous transmission, performs carrier sensing and the random backoff control to acquire the channel access right, and then transmits the trigger frame.

It is noted that, if processing operations in Step S30 to S33 in the STA are excluded, processing operations in Step S34 to S39 in the AP are basically the same as those in Steps S11 to S15 in the first embodiment. In the present embodiment, it is determined whether or not the simultaneous transmission is possible based on the pieces of station information collected by a predetermined STA x, and then the combination of STAs performing the simultaneous transmission is finally selected using the pieces of station information collected by the AP, or using the pieces of station information in conjunction with the combination information or the station information of the STAs performing the simultaneous transmission which is determined by the STA x. Thus, a processing load on the AP can be reduced.

Fourth Embodiment

Figure 6:
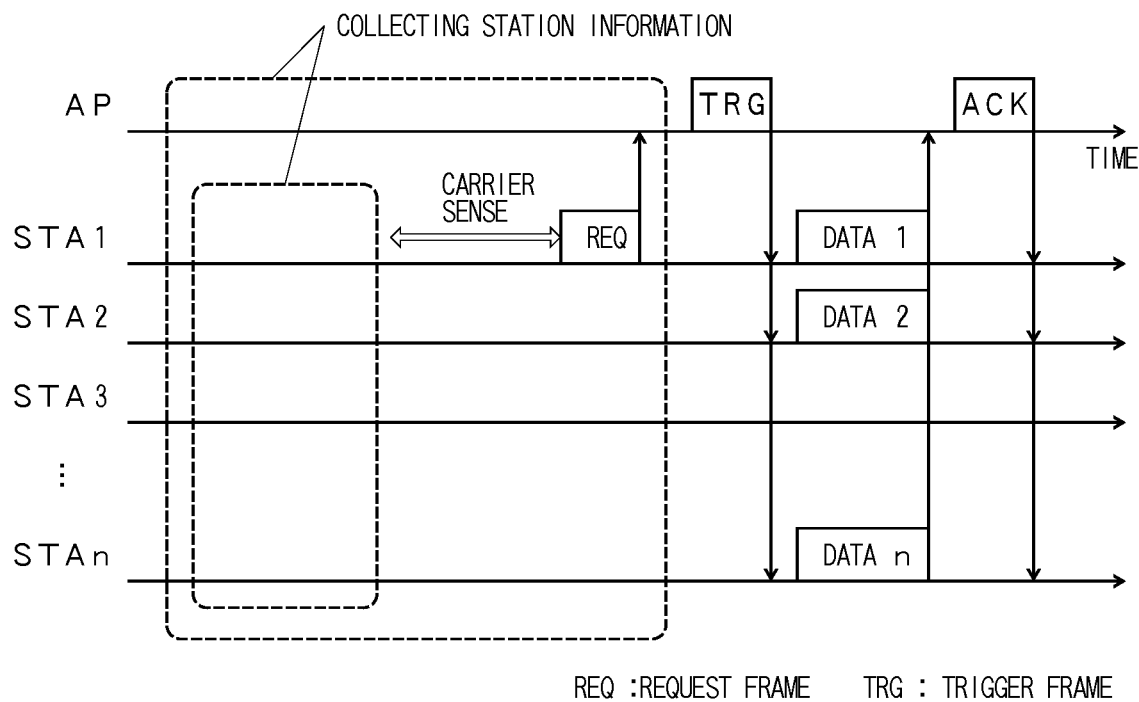
FIG. 6 is a diagram illustrating a control sequence according to a fourth embodiment in the wireless communication system according to the present invention.

FIG. 6 is a control sequence according to a fourth embodiment in the wireless communication system according to the present invention.

Figure 10:
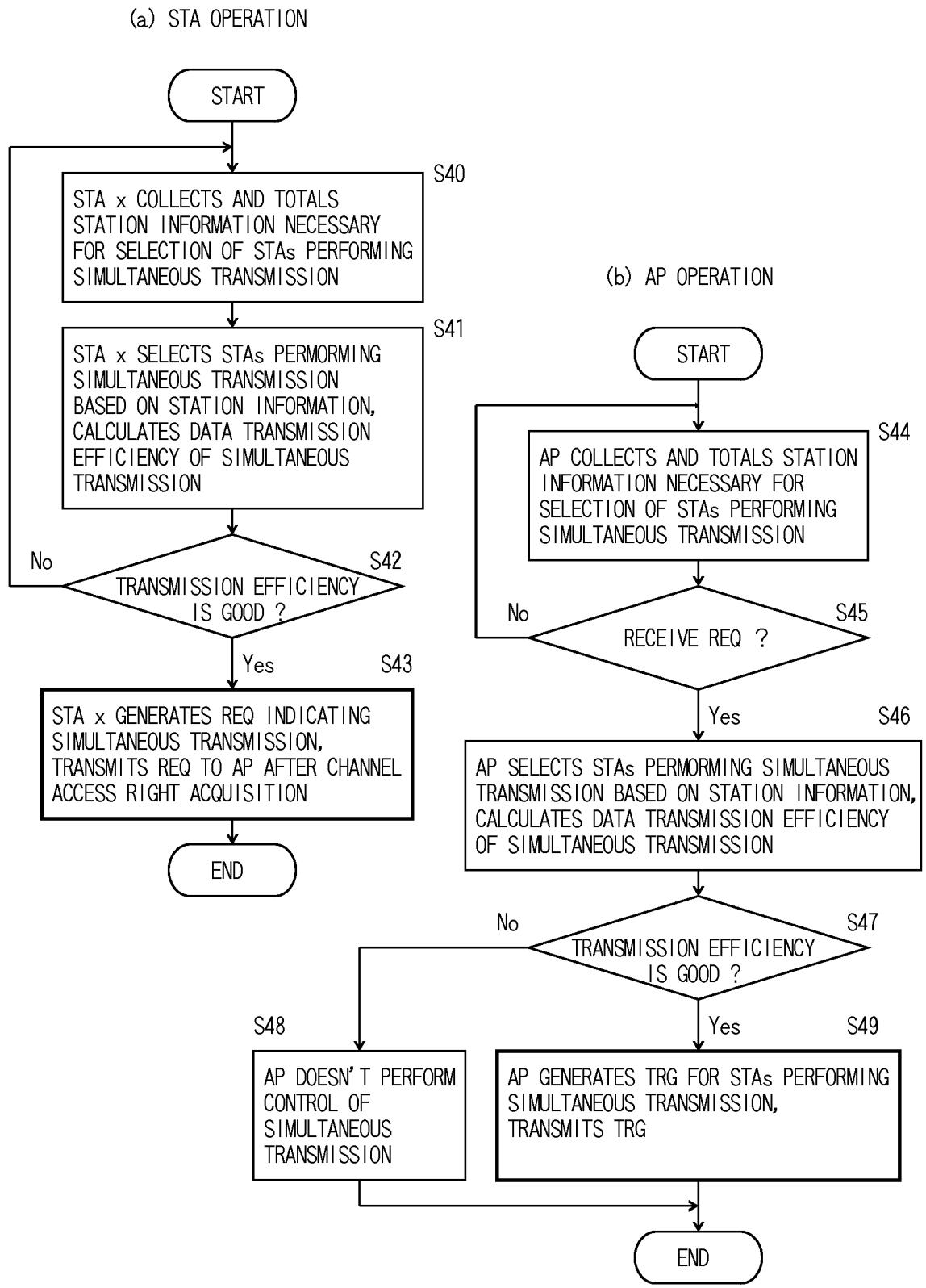
FIG. 10 is a flowchart illustrating a simultaneous transmission control procedure for an STA and an AP according to a fourth embodiment in the wireless communication system according to the present invention.

FIG. 10 illustrates Steps S40 to S43 in which processing operations by the STA are performed and Steps S44 to S49 in which processing operations by the AP are performed, as a procedure for control of simultaneous transmission according to the fourth embodiment in the wireless communication system according to the present invention. It is noted that processing operations in Step S40 to S42 and S44 to S48 in the fourth embodiment are the same as those in Steps S30 to S32 and S34 to S38 in the third embodiment, and processing operations in Steps S43 and S49 are different from those in Steps S33 and S39 in the third embodiment.

When it is determined in Step S42 that the data transmission efficiency of the simultaneous transmission is good, in Step S43, a predetermined STA x generates the request frame indicating that the simultaneous transmission is possible, acquires the channel access right by performing the carrier sensing and the random backoff control, and then transmits the generated request frame to the AP. The request frame, like the request frame that is transmitted by the STA 1 to the AP in the third embodiment, may include the combination information or the station information of the STAs performing the simultaneous transmission. On the other hand, if it is redetermined in Step S47 that the data transmission efficiency of the simultaneous transmission is good, in Step S49, the AP generates the trigger frame instructing to perform the uplink simultaneous transmission for the selected STAs performing the simultaneous transmission, and transmits the generated trigger frame.

In this manner, like in the second embodiment, in the fourth embodiment, based on the channel access right acquired by a predetermined STA x, the AP transmits the trigger frame. Therefore, in the same manner as in the second embodiment, when the STA acquires the channel access right and transmits a request frame, and when the AP that received the request frame intends to transmit the trigger frame after the SIFS time, the trigger frame can be reliably transmitted by the channel access right acquired by the STA, and the simultaneous transmission can be started. Furthermore, when a time it takes from the AP to receive the request frame and transmit the trigger frame until the STAs complete the simultaneous transmission is assumed and when the NAV is set to other STAs that are not selected as the STAs performing the simultaneous transmission by the request frame transmitted by the STA or by the RTS/CTS frame transmitted and received separately, the STAs selected by the trigger frame of the AP can reliably perform the simultaneous transmission.

In the first to fourth embodiments described above, the procedure for the simultaneous transmission from the plurality of STAs to the uplink direction is described, but if there is the downlink data frame in the AP that is transmitted to the STA, the transmission in the downlink direction and the simultaneous transmission in the uplink direction may be performed successively. For example, in the first to fourth embodiments described above, if the AP starts control of the simultaneous transmission in the uplink direction, the presence or absence of the downlink data frame is determined, and if the downlink data frame is not present, the trigger frame is transmitted as in each embodiment and the simultaneous transmission is performed on the STA selected in a combination of STAs performing the simultaneous transmission. On the other hand, if the downlink data frame is present in the AP, the transmission of the trigger frame may be performed in succession to the transmission and reception of the downlink data frame and the ACK. In this case, a combination of the STA that is a destination in the downlink direction and the STAs performing the simultaneous transmission in the uplink direction is set to be in common, and the downlink data frame and the trigger frame may be transmitted in conjunction with each other and the ACK in the downlink data frame may be transmitted in conjunction with the data frame in the uplink. Alternatively, the transmission of the downlink data frame may be performed in succession with the transmission of the trigger frame by the AP and the uplink simultaneous transmission by the STA. In the case of the successive processing, a period of time when the channel access right that is acquired in the AP or the STA is transmitted and received is assumed.

In the first and third embodiments described above, with the trigger frame, the NAV that prevents neighboring stations from performing the transmission can be set. The length of the NAV period that is set at this point is set based on pieces of station information that are collected. Several methods of setting or revising the NAV are considered.

(1) With the trigger frame, the transmission of the data frame is simply requested without setting the NAV. In this case, before the STA transmits the data frame, the STA can transmit an RTS frame and the AP can reply with a CTS frame and start to transmit the data frame.

(2) The NAV is set by performing polling that uses the trigger frame or the RTS frame for the STA that can be a destination. In this case, with the trigger frame or the RTS frame, the NAV is set for neighboring stations, and data frames are collected from one or more STAs. Lastly, the trigger frame is retransmitted, leading to the simultaneous transmission.

(3) The trigger frame or the RTS frame that includes a plurality of destination addresses, a response to which is requested by the AP, is transmitted, and the NAV is set for neighboring stations. The STAs, each of which is designated with a destination address of the trigger frame, may further be caused to provide the responses to the trigger frames in order or to provide the response to the trigger frames simultaneously using a multiple access scheme, and thus a change in the length of the NAV period may be designated. Lastly, the trigger frame is retransmitted, leading to the simultaneous transmission.

(4) A first trigger frame is transmitted as the trigger frame, it is checked that the designated STA replies with a second trigger frame, a third trigger frame is further transmitted, and the data frame is received from the STA that replies with the second trigger frame. With the first trigger frame, the length of the NAV period from pieces of station information that are collected is set for neighboring stations, but in the present method, alternatively, a length of the NAV period, which is decided in advance, is set. The STA receives the first trigger frame, and transmits the second trigger frame. At this time, a plurality of STAs may transmit the second trigger frames simultaneously, may transmit the second trigger frame at a timing scheduled in a designated time by the first trigger frame, may transmit the first trigger frame to the STAs, one after the other, and may reply with the second trigger frame in order. The AP transmits the third trigger frame for providing an instruction that the STA which normally receives the second trigger frame perform the transmission. On this occasion, with the third trigger frame, the change in the length of the NAV period may be designated based on the station information that is included in the second trigger frame, or the combination of STAs that can normally transmit the second trigger frame. At this point, with the first trigger frame and the second trigger frame, the NAV may be set in the same manner as in the exchange between the RTS and CTS, and the NAV of the neighboring stations for which the first trigger frame is set may be canceled if the third trigger frame is not transmitted. The third trigger frame may include information, as a synchronization signal, necessary for the STAs performing the simultaneous transmission, and may have a function as transfer of a transmission right. If the third trigger frame functions as the transfer of the transmission right, the third trigger frame may be transmitted after performing the transmission of the data frame in the downlink direction on a single STA or a plurality of STAs, without the third trigger frame being transmitted immediately after the second trigger frame is received.

In the second and fourth embodiments described above, with the request frame that is transmitted by the STA, the NAV that prevents the neighboring stations from performing the transmission can be set. At this point, a value of the length of the NAV period that is set is a value, which is announced in advance by the AP, or is calculated from a length necessary for the data frame that the STA wants to transmit. Several methods of setting or revising the NAV are considered.

(1) The request frame requests the transmission of the trigger frame without setting the NAV. In a sequence after the transmission of the trigger frame, the communication can be performed with the three methods that are described in the first and third embodiments described above.

(2) The transmission of the trigger frame is requested while the NAV is set by performing the polling that uses the request frame. In this case, with the request frame, the NAV is set for neighboring stations, and the AP is caused to transmit the trigger frame. On this occasion, in the AP, according to the information, such as the length of the NAV period that is designated by the STA, the combination of STAs that perform the multiple-user simultaneous transmission in the uplink may be decided or changed. After the transmission of the trigger frame, the communication can further be performed with the three methods that are described in the first and third embodiments described above. Because the NAV is set one time with the request frame, the length of the NAV period can be changed with subsequent communication.

An MCS index that indicates the modulation method and the coding rate which are used for the user data in the first to fourth embodiments described above, for example, can be decided in the AP or the STA as follows. The MCS index is decided taking into consideration a result of the communication so far, but can be decided in view of the penalty due to the performing of the multiple-user simultaneous transmission. If the decision is made taking into consideration the result of the communication so far, the decision can be made in such a manner that the MCS index at which the communication succeeds under the condition that the multiple-user simultaneous transmission be the same or in such a manner that an MCS index that has the smaller number of bits per data frame than the MCS index at which the communication fails under the condition that the multiple-user simultaneous transmission be the same. If the penalty due to the multiple-user simultaneous transmission is used, for the MCS index that is used when single user communication is performed, the decision is made using the number of STAs that are multiplexed due to the multiple-user simultaneous transmission, or using an access type for multiple-user simultaneous transmission and the number of STAs that are multiplexed. The access type, for example is Frequency Division Multiple Access (FDMA), Spatial Division Multiple Access (SDMA) (or MU-MIMO), or a multiple access scheme that uses both. It is considered that, in the case of FDMA, the communication quality decreases due to inter-user interference that results from frequency deviation and that, in the case of the MU-MIMO, the communication quality decreases due to inter-user interference that occurs from the incompleteness of spatial signal demultiplexing. Because of this, the MCS index has to be changed as much as the communication is degraded, in such a manner as to correspond to the small number of bits. Generally, MU-MIMO is greater in penalty than FDMA. As examples of a method of deciding the MCS index that is used by the STA in the data frame, the following methods are considered.

(1) The number of multiplexed users and a method of user multiplexing are announced from the AP, and in the STA, from the information, the MCS index is decided that corresponds to the number of bits which is smaller than in the case of single user communication, with reference to the penalty from a table that is stored in advance.

(2) The number of multiplexed users and the method of user multiplexing that are used in the AP are estimated, and from the number of multiplexed users and the method of user multiplexing that are assumed, the MCS index is decided that corresponds to the number of bits that is smaller than in the case of the single user communication, with reference to the penalty from the table that is stored in advance. Furthermore, when it comes to deciding the penalty, the penalty for a user combination can also be calculated from a value of correlation of propagation characteristic information on a channel status to the STA.

(3) The penalty due to the multiple-user simultaneous transmission is announced from the AP, and the MCS index is decided that corresponds to the number of bits which is smaller than in the case of the single user communication.

(4) The MCS index that is used for the multiple-user simultaneous transmission is announced from the AP, and the designated MCS index is used.

As a specific index of the penalty, a value indicating the extent to which the number of bits has to be decreased according to an option of being able to select the MCS index that can be used can be used, or a value that results from quantizing an amount of decrease in signal-to-interference-plus-noise ratio (SINR) or quantizing 1 or smaller or a value in the digital form can be used. For example, if bidirectional communication in the uplink using MU-MIMO is performed on two STAs, it can be announced that the MCS index is lowered by one and it can be announced that the SINR is lowered by 2 dB.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

What is claimed:

1. A wireless LAN access point in a wireless communication system in which one wireless LAN access point (which is hereinafter referred to as an "AP") and a plurality of wireless LAN stations (each of which is hereinafter referred to as an "STA") are connected to each other, and in which an uplink data frame is simultaneously transmitted from each of the plurality of STAs to the AP in a multiple access scheme, the wireless LAN access point comprising:

a station information collection unit that collects station information from the plurality of STAs, where the station information is used for selection of STAs performing simultaneous transmission and for control of the simultaneous transmission, said station information being traffic information in each STA in the plurality of STAs, or a received power from each STA in the plurality of STAs, or a channel status from each STA in the plurality of STAs;

a simultaneous-transmission determination unit that selects, from among said plurality of STAs, a combination of STAs performing the simultaneous transmission based on the station information;

a set of downlink transmission queues, where each downlink transmission queue in the set of downlink transmission queues corresponds to a different access category;

a downlink access control unit that transmits a downlink data frame via one of the downlink transmission queues;

a trigger transmission unit that transmits to each of the STAs, which simultaneously transmits the uplink data frame, a trigger frame via a trigger transmission queue, where the trigger frame instructs to perform the simultaneous transmission, and includes information necessary for the control of the simultaneous transmission; and a set of CSMA/CA control units, where each CSMA/CA control unit corresponds to a downlink transmission queue in the set of downlink transmission queues and acquires a channel access right for transmitting the trigger frame or a downlink data frame from the AP to each of the STAs; and a set of selection units, where each selection unit corresponds to a downlink transmission queue in the set of downlink transmission queues and selects a downlink frame or a trigger frame to be transmitted by using the channel access right acquired by the corresponding CSMA/CA control unit.

2. A wireless communication method in which one wireless LAN access point (which is hereinafter referred to as an "AP") and a plurality of wireless LAN stations (each of which is hereinafter referred to as an "STA") are connected to each other, and in which an uplink data frame is simultaneously transmitted from each of the plurality of STAs to the AP in a multiple access scheme, comprising:

collecting station information from the plurality of STAs, where the station information is used for selection of STAs performing the simultaneous transmission and for control of the simultaneous transmission, said station information being traffic information in each STA in the plurality of STAs, or a received power from each STA in the plurality of STAs, or a channel status from each STA in the plurality of STAs;

selecting among said plurality of STAs a combination of STAs performing the simultaneous transmission based on the station information;

transmitting a downlink frame via a downlink transmission queue in a set of downlink transmission queues, where each downlink transmission queue in the set of downlink transmission queues corresponds to a different category;

inserting a trigger frame into a trigger transmission queue;

transmitting to each of the STAs, which simultaneously transmits the uplink data frame, a trigger frame via the trigger transmission queue, where the trigger frame instructs to perform the simultaneous transmission and includes information necessary for the control of the simultaneous transmission; and acquiring, by a given CSMA/CA control unit in a set of CSMA?CA control units, a channel access right for transmitting the trigger frame or a downlink data frame from the AP to each of the STAs, where each CSMA/CA control unit corresponds to a downlink transmission queue in the set of downlink transmission queues;

selecting, a given selection unit in a set of selection units, a downlink frame or a trigger frame to be transmitted using the channel access rights, where each selection unit corresponds to a downlink transmission queue in the set of downlink transmission queues; and transmitting the selected downlink data frame or the selected trigger frame using the channel access right acquired by the common CSMA/CA control unit.

* * * * *

UNITED STATES PATENT AND TRADEMARK OFFICE
CERTIFICATE OF CORRECTION

PATENT NO. : 11,889,557 B2
APPLICATION NO. : 17/690625
DATED : January 30, 2024
INVENTOR(S) : Shoko Shinohara et al.

It is certified that error appears in the above-identified patent and that said Letters Patent is hereby corrected as shown below:

In the Claims

Claim 2, Column 20, Line number 48  "CSMA?CA" should be -- CSMA/CA --

Signed and Sealed this
Thirtieth Day of April, 2024

Katherine Kelly Vidal
*Director of the United States Patent and Trademark Office*